United States Patent [19]

Thaler et al.

[11] Patent Number: 5,906,966
[45] Date of Patent: May 25, 1999

[54] DRILLING MUD ADDITIVES AND IN ADDING VISCOSIFICATION ADDITIVES TO OIL-BASED DRILLING MUDS

[75] Inventors: Warren A. Thaler, Flemington, N.J.; John C. Newlove, Kingwood, Tex.; Cruise K. Jones, Glen Gardner, N.J.; David B. Acker, Woodlands, Tex.

[73] Assignee: Exxon Research and Engineering Co., Florham Park, N.J.

[21] Appl. No.: 08/029,754

[22] Filed: Mar. 11, 1993

Related U.S. Application Data

[63] Continuation of application No. 07/909,321, Jul. 6, 1992, abandoned, which is a continuation of application No. 07/720,043, Jun. 24, 1991, abandoned.

[51] Int. Cl.⁶ ....................................................... C09K 7/06
[52] U.S. Cl. ............................ 507/122; 507/117; 507/135
[58] Field of Search .......................... 252/8.551; 507/122, 507/117, 135

[56] References Cited

U.S. PATENT DOCUMENTS 4,442,011  4/1984  Thaler et al. ............................ 507/122
4,447,338  5/1984  Lundberg et al. ....................... 507/122

FOREIGN PATENT DOCUMENTS

83/02951  9/1983  WIPO .

*Primary Examiner*—Philip Tucker

[57] ABSTRACT

The present invention is based on the discovery that viscosification agents selected from sulfonated and neutralized sulfonated ionomers can be readily incorporated into oil-based drilling muds in the form of an oil soluble concentrate containing the polymer. Thus, one embodiment of the present invention provides an additive concentrate for oil-based drilling muds comprising a drilling oil, especially a low toxicity oil, and from about 5 gm to about 20 gm of sulfonated or neutralized sulfonated polymer per 100 gm of oil. Indeed, oil solutions obtained from the sulfonated and neutralized sulfonated polymers used as viscosification agents are readily incorporated into drilling mud formulations.

2 Claims, No Drawings

5,906,966

DRILLING MUD ADDITIVES AND IN ADDING VISCOSIFICATION ADDITIVES TO OIL-BASED DRILLING MUDS

This is a division, of application Ser. No. 07/909,321, filed Jul. 6, 1992 now abandonded, which is a continuation of Ser. No. 07/720,043 filed Jun. 24, 1991, now abandonded.

FIELD OF THE INVENTION

This invention relates to improvements in drilling mud additives and in incorporating viscosification additives in drilling muds. More particularly, the invention relates to improvements in adding sulfonated and neutralized sulfonated polymers to oil-based drilling muds.

BACKGROUND OF THE INVENTION

In drilling for oil and gas, drilling muds play an important role. Drilling muds are the fluids which are used to maintain pressure, cool drill bits, and lift cuttings from the drill holes. Although drilling muds vary in composition over a wide spectrum, generally, they fall into two classes; either aqueous formulations or oil formulations.

The choice of formulation used is dictated in part by the nature of the formation in which drilling is to take place. For example, in various types of shale formations, the use of conventional water-based muds can result in a deterioration and collapse of the formation. The use of an oil-based formulation circumvents this problem.

A conventional oil-based drilling mud formulation is comprised basically of the following ingredients: oil (generally a diesel oil), emulsifying agents (alkaline soaps of fatty acids), wetting agents (dodecylbenzene sulfonate), water (generally a NaCl or $CaCl_2$ brine), barite, barium sulfate, or other weighting agents, and normally amine treated clays (employed as a viscosification agent).

More recently, neutralized sulfonated ionomers have been found to be particularly useful as viscosification agents in oil-based drilling muds. See, for example, U.S. Pat. No. 4,442,011 and U.S. Pat. No. 4,447,338.

These neutralized sulfonated ionomers are prepared by sulfonating an unsaturated polymer such as butyl rubber, EPDM terpolymer, partially hydrogenated polyisoprenes and polybutadienes. The sulfonated polymer is then neutralized with a base and thereafter steam stripped to remove the free carboxylic acid formed and to provide a neutralized sulfonated polymer crumb.

To incorporate the polymer crumb in an oil-based drilling mud, the crumb must be milled, typically with a small amount of clay as a grinding aid, to get it in a form that is combinable with the oil and to keep it as a noncaking friable powder. Often, the milled crumb is blended with lime to reduce the possibility of gelling when used in the oil. Subsequently, the ionomer containing powder is dissolved in the oil used in the drilling mud composition. Unfortunately, the crumb, either alone or with lime, is difficult to dissolve, which is an especially serious disadvantage in the field.

Accordingly, it is an object of the present invention to provide sulfonated polymers, including neutralized sulfonated polymers, in a form readily combinable with other drilling mud components.

Another object of the invention is to provide an improved method for preparing oil-based drilling mud compositions.

These and other objects w ill be readily appreciated upon a reading of the description which follows.

SUMMARY OF THE INVENTION

The present invention is based on the discovery that viscosification agents selected from sulfonated and neutralized sulfonated ionomers can be readily incorporated into oil-based drilling muds in the form of an oil soluble concentrate containing the polymer. Thus, one embodiment of the present invention provides an additive concentrate for oil-based drilling muds comprising a drilling oil, especially a low toxicity oil, and from about 5 gm to about 20 gm of sulfonated or neutralized sulfonated polymer per 100 gm of oil. Indeed, oil solutions obtained from the sulfonated and neutralized sulfonated polymers used as viscosification agents are readily incorporated into drilling mud formulations.

Thus, in another embodiment of the present invention, there is provided a method for preparing an oil solution of a sulfonated or neutralized sulfonated ionomer comprising the steps of dissolving an unsaturated polymer in a drilling mud oil, especially a low toxicity oil, adding to the oil a sulfonating agent in an amount sufficient to provide a sulfonation level in the range of about 5 to about 50 mmol per 100 gm of polymer, thereby forming a solution of a sulfonated polymer and an oil suitable for being readily incorporated in drilling mud compositions and optionally adding a base to the solution of sulfonated polymer in an amount sufficient to neutralize the polymer, thereby forming a solution of a neutralized sulfonated polymer suitable for being readily incorporated in drilling mud compositions.

These and other embodiments of the present invention will be more readily understood upon reading the "Detailed Description of the Invention" which follows.

DETAILED DESCRIPTION OF THE INVENTION

In accordance with the present invention, a sulfonated ionomer is prepared in an oil used in oil-based drilling mud compositions. In the practice of the present invention, the sulfonated elastomeric polymers are derived from unconjugated diene polymers, which include unsaturated elastomeric polymers, such as butyl rubber, EPDM terpolymers and other unsaturated polymers, such as partially hydrogenated polyisoprenes, partially hydrogenated polyisobutadienes and the like.

In the practice of the present invention, it is particularly preferred to use an EPDM terpolymer. As is known, EPDM terpolymers are unsaturated polymers having from about 1 to about 10 wt. % olefinic saturation, as established by A.S.T.M. Test Method D1418-54. These polymers contain ethylene and propylene in the backbone and a diene in the side chain. One method for producing these terpolymers is found in U.S. Pat. No. 3,280,082, for example. Illustrative of the diene monomer in the EPDM terpolymer normally is a non-conjugated diene, such as 1,4-hexadiene, dicyclopentadiene, 5-ethylidene-2-norbornene, 5-methylene-2-norbornene, 5-propenyl-2-norbornene and methyl tetrahydroindene.

A typical EPDM terpolymer is Vistalon 2504, sold by Exxon Chemical Company, Houston, Tex., a terpolymer having a Mooney viscosity (ML, 1+8, 212° F.) of about 40 and having an ethylene content of about 50 wt. % and 5-ethylidene-2-norbornene content of about 5 wt. %. The number average molecular weight, $\overline{M}n$, as measured by GPC for Vistalon 2504, is about 47,000.

Another EPDM terpolymer, Vistalon 2504-20, sold by Exxon Chemical company, Houston, Tex., is derived from the Vistalon 2504 by a controlled extrusion process wherein the resultant Mooney viscosity, at 212° F., is about 20. The $\overline{M}n$, as measured by GPC of Vistalon 2504-20, is about 26,000.

In the process of this invention, the unsaturated polymer, especially the EPDM terpolymer, is dissolved in a light hydrocarbon oil to provide a solution having from about 5 to about 20 wt. % of polymer in the oil. Preferably, the oil is low in unsaturation. More preferably, the oil is a low toxicity oil. Oils with aromatic contents below about 15% are described in the industry as low toxicity oils. In the practice of the present invention, it is preferred that the oil have less than 10% aromatics and, preferably, less than 1% aromatic content. Escaid 110, sold by Exxon Company, U.S.A., Houston, Tex., is a suitable low toxicity oil. Escaid 110 is a desulfurized hydrogenated kerosene containing less than 0.1% sulfur and less than 1% aromatics.

After dissolving the unsaturated polymer in the oil, a sulfonating agent is added. Generally, the amount of sulfonating agent will be sufficient to provide sulfonation levels in the polymer of from about 5 to about 50 mmol per 100 gm of polymer and, more preferably, between about 25 to 35 mmol per 100 gm of polymer. A typical sulfonating agent is an acyl sulfate, which is readily prepared by premixing an appropriate acid anhydride with concentrated sulfuric acid; e.g., 95%, under controlled temperature conditions. Typical acid anhydrides used include acetic anhydride, propionic, butyric, amyl anhydride and the like. Optionally, the sulfonating agent can be generated in the solution of the unsaturated polymer in the oil. Whether the acyl sulfate is prepared by premixing the anhydride with the sulfuric acid under controlled temperature conditions or it is prepared in situ, the sulfonation reaction is generally conducted by mixing the sulfonating agent and the polymer solution for about 2 to about 200 minutes and, preferably, for about 10 to about 60 minutes at temperatures between about 0° C. and 150° C. and, preferably, at temperatures between 20° C. and about 80° C.

After sulfonation, a small amount of water may be added to hydrolyze any excess anhydride to the corresponding carboxylic acid, although this is not required.

The resulting solution, comprising from about 5 gm to about 20 gm of sulfonated polymer per 100 gm of oil, is readily incorporated into oil-based drilling mud formulations and constitutes an extremely useful drilling mud additive.

Optionally and preferably, after sulfonating the polymer, the polymer is then neutralized by the addition of a base. Typically, alkali metal hydroxides or acetates in water or in an alcohol can be utilized, although if methanol is used, it will generally need to be removed, for example, by distillation because of its toxicity. Metal alkoxides in alcohol solutions can also be utilized. Oxides of zinc, magnesium and calcium can be combined with the polymer solution. Particularly useful bases are colloidal dispersions of overbased alkyl benzene sulfonates in oils. Divalent and trivalent metal carboxylates can also be utilized. The amount of base used will, of course, be sufficient to neutralize the sulfonated polymer.

In any event, after neutralizing the sulfonated polymer, a solution of the neutralized sulfonated polymer in the oil is obtained. This solution, comprising from about 5 to about 20 gm of neutralized sulfonated polymer per 100 gm of oil is readily incorporated in base oil mud compositions.

The following examples will serve to demonstrate the embodiments of this invention.

EXAMPLE 1

100 gm of EPDM polymer are dissolved in 900 gm of a desulfurized hydrogenated kerosene containing less than 0.1% sulfur and less than 1.0% aromatics, using a well stirred reactor. The polymer solution is contacted with a cold solution of acetyl sulfate prepared in a premix reaction of 49.7 gm of acetic anhydride and 31.0 gm concentrated sulfuric acid. Ten percent of this premix, corresponding to 4.97 gm acetic anhydride and 3.10 gm of sulfuric acid, is added to the EPDM solution. The reaction mixture is stirred at 50° C. for 0.5 hours, at which time 1 gm of water was added.

Three 300 gm aliquots of this solution were taken. The remainder was precipitated in isopropyl alcohol (IPA), dried in a vacuum oven and analyzed for sulfur content.

Aliquot 1: 6 gm of Nopcogen22 (an imidazoline made from oleic acid and sold by Diamond Shamrock Chemical Co., Irving, Tex.) was added and the resulting solution evaluated for ease of combination and performance as a drilling mud additive.

Aliquot 2: 7.3 gm, Corexit 9597 (an oil-derived imidazoline sold by Exxon Chemical Company, Houston, Tex.) were added and the resulting solution evaluated for ease of combination and performance as a drilling mud additive.

Aliquot 3: 3.9 gm of a 25% solution of sodium methoxide in methanol were added, followed by 6 ml IPA and the product analyzed for ease of combination and performance as a drilling mud additive.

Each of the three aliquots were separately tested for ease of mixing with an unweighted mud system comprising oil/water ratio of an 80/20 oil/water ratio containing 10 PPB emulsifier, 8 PPB lime and 30 PPB drill solids. In each instance, the polymer was rapidly incorporated into the drilling mud base, as evidenced by the significant increase in the viscosity of the drilling mud solution. Indeed, significant increases in viscosity were noted within a few seconds.

In contrast thereto, a polymer crumb consisting of a zinc neutralized sulfonated EPDM, when mixed with the base drilling mud, was not readily combined in the mud, as evidenced by the fact that, depending upon the temperature of the mud solution, it took from 30 minutes to several hours before there was any noticeable increase in the viscosity of the drilling mud.

EXAMPLE 2

Following the general procedures outlined in Example 1, a solution of 100 gm of Royalene 521 (an EPDM polymer sold by Uniroyal, Middlebury, Conn.) in 900 gm of Escaid 110, a low toxicity oil sold by Exxon Chemical Company of Houston, Tex., were sulfonated and evaluated for ease of mixing in oil mud formulation. As with the case of the metal neutralized sulfonated solutions listed in Example 1, this non-neutralized sulfonated polymer formed in the low toxicity oil was readily incorporated into the mud formulation, as evidenced by the increase in its viscosity of the mud formulation within a few seconds of mixing.

What is claimed is:

1. In the method of preparing an oil-based drilling mud fluid composition by combining a viscosification agent selected from the group consisting of sulfonated and neutralized sulfonated polymers with a base oil mud formulation, the improvement consisting essentially of:

first forming a solution of a low unsaturated polymer in a hydrocarbon oil in amounts to provide from about 5 wt. % to about 20 wt. % of the polymer in the oil; and adding a sulfonating agent to the solution of the polymer in the oil in an amount sufficient to provide about 50 mmol to about 100 mmol of pendant sulfonate groups per 100 gm of polymer, whereby a solution of sulfonated polymer in the oil is obtained and when the viscosification agent is a neutralized sulfonated polymer adding a base to the solution of sulfonated polymer in an amount sufficient to neutralize the polymer; and thereafter combining the solution of the sulfonated polymer or neutralized sulfonated polymer with the base oil mud formulation, whereby an oil-base drilling fluid composition is prepared.

2. The improvement of claim 1 wherein the polymer dissolved in the oil is an EPDM polymer.

* * * * *